United States Patent [19]
Takato et al.

[11] Patent Number: 5,721,979
[45] Date of Patent: Feb. 24, 1998

[54] CAMERA

[75] Inventors: Hideyasu Takato, Hino; Kazumi Ito, Mitaka, both of Japan

[73] Assignee: Olympus Optical Co., Ltd., Tokyo, Japan

[21] Appl. No.: 709,820

[22] Filed: Sep. 10, 1996

[30] Foreign Application Priority Data

Dec. 25, 1995 [JP] Japan .................. 7-336909

[51] Int. Cl.$^6$ .................................. G03B 13/00
[52] U.S. Cl. ............... 396/106; 396/271; 396/373; 396/384
[58] Field of Search ........................ 396/106, 271, 396/373, 384

[56] References Cited

U.S. PATENT DOCUMENTS

| | | |
|---|---|---|
| 4,534,637 | 8/1985 | Suzuki et al. . |
| 4,693,582 | 9/1987 | Kawamura et al. ........... 396/106 |
| 4,707,103 | 11/1987 | Ikemori et al. ............... 396/106 |
| 4,818,865 | 4/1989 | Matsui et al. ................. 396/106 |
| 4,972,216 | 11/1990 | Ueda et al. .................... 396/106 |
| 5,341,186 | 8/1994 | Kato ................................ 396/106 |

FOREIGN PATENT DOCUMENTS

| | | |
|---|---|---|
| 57-64217 | 4/1982 | Japan . |
| 63-229439 | 9/1988 | Japan . |
| 2-29723 | 1/1990 | Japan . |
| 5-188281 | 7/1993 | Japan . |
| 5-288984 | 11/1993 | Japan . |

*Primary Examiner*—Russell E. Adams
*Attorney, Agent, or Firm*—Cushman, Darby & Cushman IP Group of Pillsbury, Madison & Sutro LLP

[57] ABSTRACT

A camera has a finder optical system and a range measuring optical system which are provided independent of a photographing optical system. The finder optical system includes an objective system having a positive refracting power, an image inverting optical member having a plurality of reflecting surfaces for erecting an image formed by the objective system, and an eyepiece system having a positive refracting power. At least one of the reflecting surfaces constituting the image inverting optical member is disposed as a path splitting member In the optical path of the objective system so that one of optical paths split by the path splitting member is used for the finder optical system and the other is used for the range measuring optical system. A positive refracting power is provided, as a whole, between the path splitting member and the imaging plane of the objective system, without any refracting power between the path splitting member and a range measuring element. In this way, the camera is capable of making a range measurement of a high degree of accuracy and having a compact finder optical system.

18 Claims, 6 Drawing Sheets

F NUMBER=1.1

CAMERA

BACKGROUND OF THE INVENTION

1. Field of the Invention

This invention relates to a camera in which a finder optical system is placed such that it is independent of a photographing optical system and, in addition, a range measuring device, namely an autofocus detecting mechanism, is provided.

2. Description of Related Art

For the range measuring device used in a lens shutter type camera, an infrared projecting, active autofocus type trigonometrical range finding technique has often been adopted in the past. This technique is such that infrared light emitted from an infrared-emitting diode (IRED) is projected through a projection lens toward an object, reflected light from the object is received by a semiconductor position sensor device (PSD) through a reception lens lying at a constant distance (base length) away from the projection lens, and a distance to the object is detected in accordance with the position where the light is incident on the PSD.

The projection lens is usually disposed so that it is independent of, and at a certain distance away from, the finder optical system. Thus, parallax will be produced between the optical axes of the projection lens and the finder optical system. In such a case, even though a photographer, when seeing through a finder, can recognize the object through a focus frame, the position of a spot emerging from the projection lens is actually shifted, and thus a point which is not intended for the photographer may be brought to a focus.

In order to obviate such a defect, cameras equipped with autofocus detecting mechanisms in which an object at which the photographer aims can be surely brought to a focus are disclosed, for example, by Japanese Patent Preliminary Publication Nos. Sho 57-64217, Sho 63-229439, Hei 2-29723, Hei 5-188281, and Hei 5-288984.

These prior art cameras are such that a path splitting member is placed in the optical path of a finder optical system so that an optical path from an object is split into paths for the finder optical system and for range measurement, and the axis of the finder optical system is made to coincide with that of a projecting optical system or receiving optical system of a range measuring device, thereby eliminating parallax.

In particular, Sho 57-64217 mentioned above refers to a virtual image mode finder optical system. This finder optical system, however, uses an objective lens having a negative refracting power, and hence if the F number of a projection lens is made small so that a range measurement can be made over a great distance with high accuracy, the objective lens will need a larger outside diameter and it becomes impossible to attain a compact design of the camera. In this way, the virtual image mode finder optical system is unsuitable for a modern compact camera.

Further, Sho 63-229439 mentioned above, followed by Hei 2-29723 and Hei 5-288984, proposes to provide the objective system of a real image mode finder optical system with the path splitting member. In this camera, a projection lens system has a lens in common with the objective system. However, it is considerably difficult that the finder optical system which requires a wide field angle even though the F number is large and the visual field is dark, is constructed with the same lens system as the range measuring optical system which requires a smaller F number and a brighter visual field rather than the wideness of the field angle.

Still further, Hei 5-188281 and Hei 5-288984 disclose cameras designed so that, at the rear of a path splitting plane placed in the objective system of the real image mode finder optical system, positive refracting powers are provided in an optical path from the path splitting plane to a range measuring element for autofocus detection and an optical path from the path splitting plane to an intermediate imaging plane of the finder optical system. Each of these cameras, although the objective system and the projection lens system are not constructed with the same lens system, does not differ essentially, in view of its power distribution, from the camera in which the objective system and the projection lens system are constructed with the same optical system. Thus, it is unreasonable that these systems are used to fulfil the requirements of both the range measuring optical system and the finder optical system mentioned above.

SUMMARY OF THE INVENTION

It is, therefore, an object of the present invention to provide a camera equipped with a compact finder optical system in which part of the objective system of the finder optical system is made to be common with part of the range measuring optical system to thereby eliminate parallax between the finder optical system and the range measuring optical system and in which power distribution is precisely performed between the finder optical system and the range measuring optical system so that a good visual field is obtained and the range measurement can be made with a high degree of accuracy.

In order to achieve the above object, according to one aspect of the present invention, the camera has the finder optical system and the range, measuring optical system which are provided to be independent of the photographing optical system, and is such that the finder optical system includes an objective system having a positive refracting power, an image inverting optical member having a plurality of reflecting surfaces for erecting an image formed by the objective system, and an eyepiece system having a positive refracting power; at least one of the reflecting surfaces constituting the image inverting optical member is placed as a path splitting member in the optical path of the objective system so that one of optical paths split by the path splitting member is used for the finder optical system and the other for the range measuring optical system; and a positive refracting power is provided, as a whole, between the path splitting member and the imaging plane of the objective system, without any refracting power between the path splitting member and a range measuring optical element.

According to another aspect of the present invention, the camera has the finder optical system and the range measuring optical system which are provided to be independent of the photographing optical system, and is such that the finder optical system includes an objective system having a positive refracting power, optical means for erecting an image formed by the objective system, and an eyepiece system having a positive refracting power; a path splitting member is placed in the optical path of the objective system so that one of the optical paths split by the path splitting member is used for the finder optical system and the other for the range measuring optical system; and a negative refracting power is provided, as a whole, between the path splitting member and the range measuring optical element.

According to still another aspect of the present invention, the camera has the finder optical system and the range measuring optical system which are provided to be independent of the photographing optical system, and is such that the finder optical system includes an objective system having a positive refracting power, an image inverting optical member having a plurality of reflecting surfaces for erecting an image formed by the objective system, and an eyepiece system having a positive refracting power; the objective system includes, in order from the object side, at least one negative lens, at least one positive lens, a path splitting member constituting the first reflecting surface of the image inverting optical member, and at least one positive lens; and one of the optical paths split by the path splitting member is used for the finder optical system and the other for the range measuring optical system.

In the camera of the present invention, the portion of the range measuring optical system having an optical axis in common with the finder optical system may be either a projection lens system or a reception lens system. If it is the projection lens system, the reception lens system will be provided independent of, and at a certain distance away from, the projection lens system.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 1 is a sectional view showing the arrangement of a finder optical system and a projecting optical system in a first embodiment of the camera according to the present invention;

FIG. 2 is a sectional view showing the arrangement of a finder optical system and a projecting optical system in a second embodiment of the camera according to the present invention;

FIG. 3 is a sectional view showing the arrangement of a finder optical system and a projecting optical system in a third embodiment of the camera according to the present invention;

FIG. 4 is a sectional view showing the arrangement of a finder optical system and a projecting optical system in a fourth embodiment of the camera according to the present invention;

FIG. 5 is a view showing the arrangement, developed along the optical axis, of the finder optical system shown in FIG. 4;

FIGS. 6A, 6B, and 6C are diagrams of aberration curves in the finder optical system of FIG. 4, showing spherical aberration, astigmatism, and distortion, respectively;

FIG. 7 is a diagram showing spherical aberration in the projecting optical system shown in FIG. 4;

FIG. 8 is a sectional view showing the arrangement of a finder optical system and a projecting optical system in a fifth embodiment of the camera according to the present invention; and FIG. 9 is a view for explaining the phenomenon that an object is out of focus because it deviates from the target of focus.

DETAILED DESCRIPTION OF THE PREFERRED EMBODIMENTS

Before undertaking the description of the embodiments, it will be expedient to explain the general function of the camera according to the present invention.

The camera of the present invention is designed so that the optical axis of the objective system of the finder optical system coincides with that of part of the range measuring optical system. Hence, parallax is not produced between the finder optical system and the range measuring optical system, and if a photographer merely recognizes an object he wants to photograph, through a finder, it is possible to take a picture which is surely brought to a focus. In an ordinary camera mounting an active autofocus detecting mechanism, three windows for the finder, projection, and reception are required for the exterior of the camera. The camera of the present invention, however, requires only two windows because the optical axis of the objective system of the finder optical system is common with that of the projecting optical system or receiving optical system of the range measuring optical system. Consequently, the number of parts can be decreased, and space effective for the layout of the camera can be utilized, which is very advantageous to for compact designs of the camera.

The great advantage of the camera according to the present invention lies in the fact that when the refracting powers of the finder optical system and the range measuring optical system are properly set and optimum focal lengths are set in these optical systems, an optical system for the finder is obtained in which the field angle is wide even though the F number is somewhat large and the visual field is dark, while for the range measurement, an optical system can be provided in which the field angle is somewhat narrower but the F number is smaller and the visual field is brighter.

Further, in the camera of the present invention, it is desirable that a distance D from the entrance surface, closest to the object of the projecting optical system constituting the range measuring optical system to the range measuring element and a focal length far of the projecting optical system satisfy the following relation:

$$D/f_{AF} > 1.1 \tag{1}$$

In the case where a zoom lens unit is used in the finder optical system, both the distance D and the focal length $f_{AF}$ represent values at a wide-angle position.

In the camera of the present invention, Eq. (1) is satisfied and thereby it becomes easy to secure sufficient space for placing the range measuring element. If the value of $D/f_{AF}$ exceeds the limit of Eq. (1), the back focal distance of the range measuring optical system will be reduced and thus it becomes difficult to secure the space for placing the range measuring element.

The finder optical system used in the camera of the present invention, which is of the real image mode, requires means for erecting an intermediate image formed by the objective system of the finder optical system. As this means it is considered that a prism or mirror is used or a relay optical system is employed. Where the former means is used, a four-reflection prism and a combination of a single reflecting surface with a pentagonal roof prism are available. In the case of such means, it is favorable that one of reflecting surfaces for image inverting means is designed to be common with a path splitting surface. By doing so, the path splitting surface for splitting paths for the finder optical system and the range measuring optical system need not be newly placed in the objective system, an increase of the number of parts can be suppressed, and space-saving is expected. Where the four-reflection means is used, however, spaces must be ensured in vertical and lateral directions of this reflection means. In view of the layout of the camera, for example, if space is lacking in the vertical direction and can be ensured, to some extent, in the lateral direction, the pentagonal roof prism may be used, or a relay lens may be placed.

Also, IREDs which constitute range measuring optical elements are available in a narrow spherical type and a planar type of package. For the range measuring optical element used in the camera of the present invention, It is only necessary to choose the element most suitable for the condition of the layout of the projecting optical system.

In accordance with the embodiments shown in the drawings, the present invention will be explained In detail below.

First Embodiment

Figure 1:
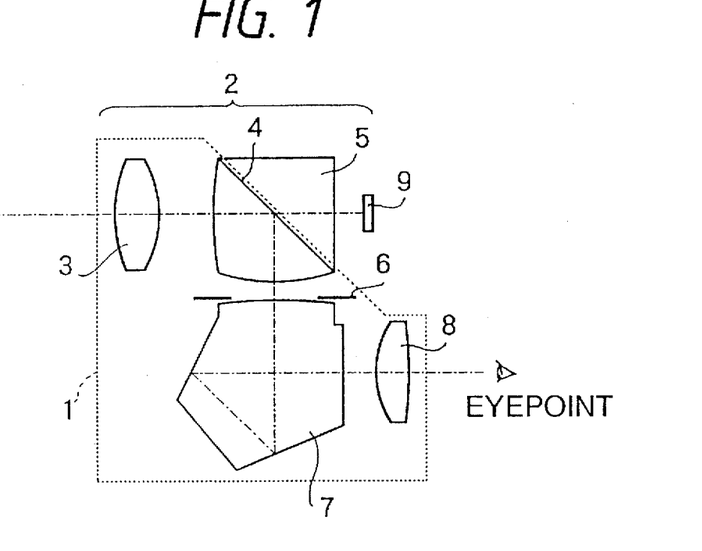

The camera of this embodiment is designed so that the optical path of the objective system of the finder optical system is partially common with that of the projecting optical system of the range measuring optical system. In FIG. 1, a finder optical system 1 comprises, in order from the object side, an objective system including a positive lens 3 and a path splitting prism 5 having a single reflecting surface (path slitting surface) 4 for inverting an image; a field frame 6; and an eyepiece system including a pentagonal roof prism 7 for inverting the image and a positive lens 8. An intermediate image formed by the objective system is erected by means of the reflecting surface 4 of the path splitting prism 5 and the pentagonal roof prism 7. A projecting optical system 2 is constructed with the positive lens 3, the path splitting prism 5, and a light-emitting element (IRED) 9 for range measurement which are arranged in order from the object side.

In the camera of the first embodiment, the finder optical system 1 has an optical path, from the positive lens 3 to the reflecting surface 4 of the path splitting prism 5, in common with the projecting optical system 2. The path splitting prism 5 is constructed in such a way that two prism components are cemented at the reflecting surface 4. Either one of the cementing surfaces of the two prism components constituting the path splitting prism 5 has a coating which allows wavelengths to be chosen so that visible light is reflected and infrared light is transmitted. By providing the reflecting surface with such wavelength dependent properties, loss in the amount of light can be reduced.

Infrared light emitted from the light-emitting element 9 is transmitted through the path splitting prism 5 and the positive lens 3, in that order, and is projected toward an object, not shown. Since the optical axis of a beam of light projected is in agreement with that of the finder optical system 1, the light beam is surely projected on the object confirmed through the field frame 6 of the finder optical system 1. The light beam reflected from the object is converged by a receiving optical system of the range measuring optical system, not shown, provided to be independent of the finder optical system 1. Subsequently, the light beam is imaged on a semiconductor position sensor device, not show, and in accordance with its imaging position, the information of a distance to the object can be derived.

The refracting power of the projecting optical system 2 cannot be made very strong to secure the place where the light-emitting element 9 is disposed. The objective system of the finder optical system, however, requires a strong refracting power, to some extent, to bring about its compact design and wide angle of view. In order to avoid such discrepancy, the camera of the first embodiment is constructed so that the refracting power Is not very strong on the object side of the path splitting surface 4 of the path splitting prism 5 and the exit surface, directed toward the pentagonal roof prism 7, of the path splitting prism 5 has a positive refracting power, thereby providing the condition met by both the projecting optical system 2 of the range measuring optical system and the objective system of the finder optical system 1.

Second Embodiment

Figure 2:
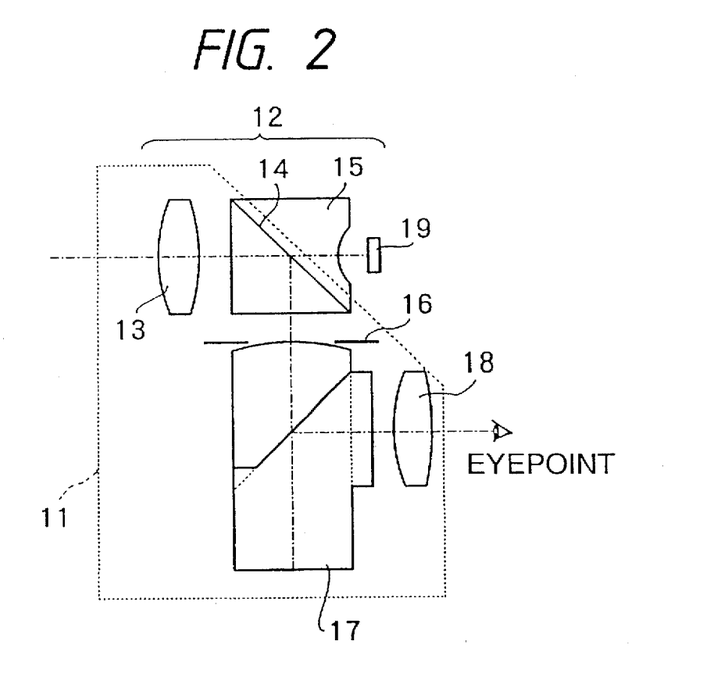

The camera of this embodiment is also designed so that the optical path of the objective system of the finder optical system is partially common with that of the projecting optical system of the range measuring optical system. In FIG. 2, a finder optical system 11 comprises, in order from the object side, an objective system including a positive lens 13 and a path splitting prism 15 having a single reflecting surface (path splitting surface) 14 for inverting an image; a field frame 16; and an eyepiece system including a three-reflection prism 17 for inverting the image and a positive lens 18. An intermediate image formed by the objective system is reflected four times by the reflecting surface 14 of the path splitting prism 15 and the three-reflection prism 17, and then is erected. A projecting optical system 12 is constructed with the positive lens 13, the path splitting prism 15, and a light-emitting element 19 for range measurement which are arranged in that order from the object side.

In the camera of the second embodiment, the finder optical system 11 has an optical path, from the positive lens 13 to the reflecting surface 14 of the path splitting prism 15, in common with the projecting optical system 12. The path splitting prism 15 used in the camera of the second embodiment is constructed, similar to that of the camera of the first embodiment, in such a way that two prism components are cemented at the path splitting surface 14. Either one of the cementing surfaces has a coating which allows wavelengths to be chosen so that visible light is reflected and infrared light is transmitted. By providing the reflecting surface with such wavelength dependent properties, loss in the amount of light can be reduced. Also, the receiving optical system of the range measuring optical system is constructed as in the camera of the first embodiment.

In the camera of the second embodiment, the refracting power of the objective system of the finder optical system 11 is governed by the positive lens 13 alone. If, however, this lens is used in the projecting optical system as it is, space for placing the light-emitting element 19 cannot be ensured. To obviate this difficulty, therefore, the camera of the second embodiment is such that the surface of the path splitting prism 15 interposed between the reflecting surface 14 and the light-emitting element 19 is provided with a negative refracting power.

Third Embodiment

Figure 3:
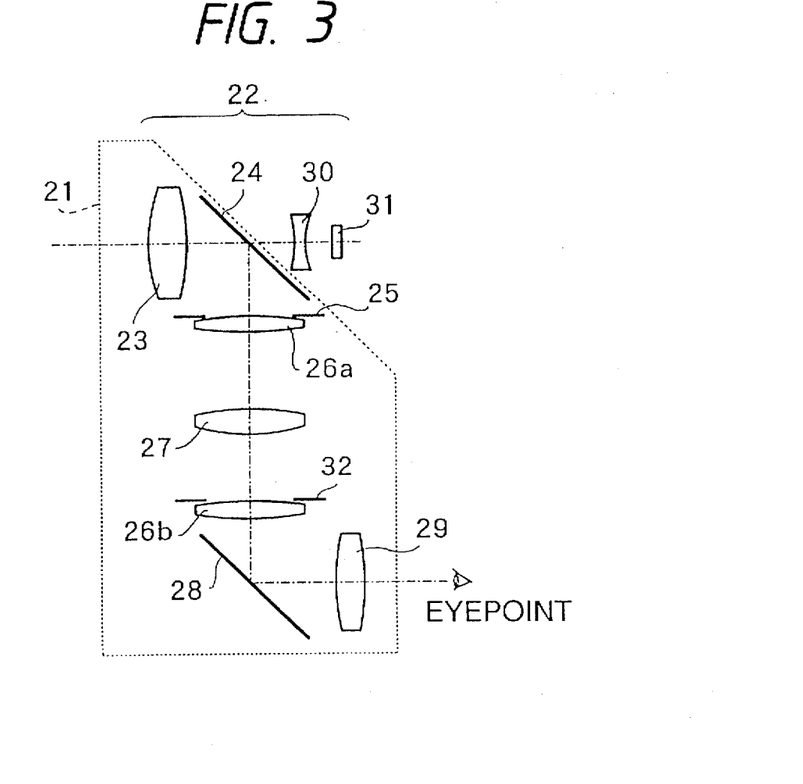

The camera of this embodiment is also designed so that the optical path of the objective system of the finder optical system is partially common with that of the projecting optical system of the range measuring optical system. In FIG. 3, a finder optical system 21 comprises, in order from the object side, an objective system including a positive lens 23; a first reflecting surface (path splitting surface) 24; a field frame 25; a field lens 26a; a relay optical system 27; a field lens 26b; a second reflecting surface 28 for conducting a finder beam to a pupil; and a positive lens 29 constituting an eyepiece system. A projecting optical system 22 is constructed with the positive lens 23, the first reflecting surface 24, a negative lens 30, and a light-emitting element 31 for range measurement which are arranged in that order from the object side.

In the camera of the third embodiment, the finder optical system 21 and the projecting optical system 22 have a common optical path which ranges from the positive lens 23 to the first reflecting surface 24 constituting the path splitting surface. The field frame 25, because the relay optical system 27 is used as image inverting means may be situated at a secondary imaging plane 32. A half mirror is used for the first reflecting surface 24 constituting the path splitting surface, which has the properties of reflecting visible light and transmitting infrared light.

In the camera of the third embodiment, although the positive lens 23 situated on the object side of the first reflecting surface 24 functions as the objective system of the finder optical system 21 as it is, the half mirror (the first reflecting mirror 24), instead of the prism, is used as a path splitting member. Thus, the negative refracting power of the exit surface, in the camera of the second embodiment, of the path splitting prism 15 on the side of the light-emitting element 19 is compensated by using the negative lens 30. Also, other constructions are the same as in the first and second embodiments.

Fourth Embodiment

Figure 4:
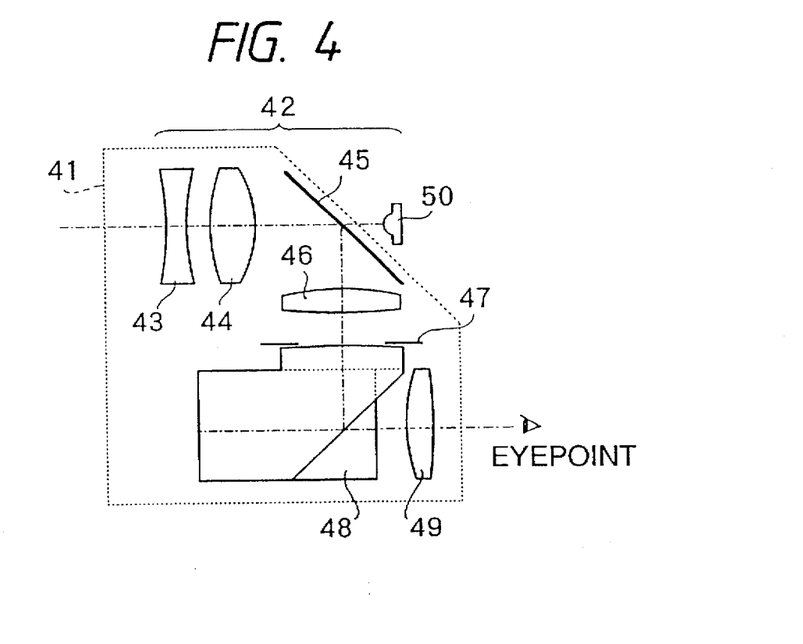

The camera of this embodiment is also designed so that the optical path of the objective system of the finder optical system is partially common with that of the projecting optical system of the range measuring optical system. In FIG. 4, a finder optical system 41 comprises, in order from the object side, an objective system including a negative lens 43, a positive lens, 44, a path splitting member 45 constituting a first reflecting surface for inverting an image, and a positive lens 46; a field frame 47; and an eyepiece system including a three-reflection prism 48 for inverting the image and a positive lens 49. In the camera of the fourth embodiment, similar to that of the second embodiment, the intermediate image formed by the objective system is reflected four times by the path splitting member 45 and the three-reflection prism 48, and becomes an erect image. A projecting optical system 42 is constructed with the negative lens 43, the positive lens 44, the path splitting member 45, and a light-emitting element 50 for range measurement which are arranged in that order from the object side.

The camera of the fourth embodiment is such that the finder optical system 41 and the projecting optical system 42 have a common optical path which ranges from the negative lens 43 to the path splitting member 45 constituting the path splitting surface. For the path splitting member 45, the half mirror is used which is the same as in the third embodiment.

In the camera of the fourth embodiment, as mentioned above, the negative lens 43 and the positive lens 44 are arranged on the object side of the path splitting member 45. The purpose of this arrangement is that the negative lens is disposed, as the projecting optical system 42, closest to the object to thereby ensure space for placing the light-emitting element 50. Moreover, since the objective system of the finder optical system 41 and the projecting optical system 42 have the two lenses in common, aberrations produced in the objective system and the projecting optical system 42 can be favorably corrected at the same time. The objective system satisfies all the conditions of the focal length and the F number required for the projecting optical system 42. As a result, the objective system of the finder optical system somewhat increases in focal length. To correct for this, the positive lens 46 with refracting power is placed between the path splitting member 45 and the field frame (intermediate imaging plane) 47. The placement of the positive lens 46 makes it possible to provide the entire objective system with a higher refracting power than in the projecting optical system 42 and to intend compact design of the whole of the finder optical system 41.

Figure 5:
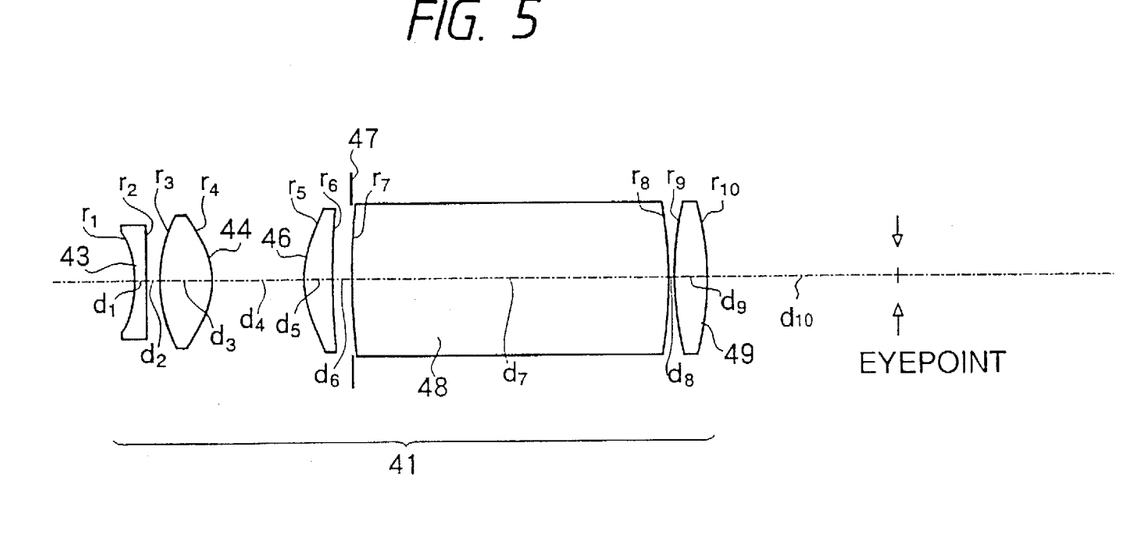

FIG. 5 shows the arrangement, developed along the optical axis, of the finder optical system 41 constructed as described above.

The following is the numerical data of optical elements constituting the finder optical system 41 used in the camera of the fourth embodiment.

$r_1 = -13.6732$ (aspherical)
$d_1 = 1.0000$ $n_1 = 1.58423$ $v_1 = 30.49$
$r_2 = 61.5408$ (aspherical)
$d_2 = 1.3000$
$r_3 = 11.0300$
$d_3 = 4.5000$ $n_3 = 1.52542$ $v_3 55.78$
$r_4 = -6.3137$ (aspherical)
$d_4 = 8.0000$
$r_5 = 8.5002$ (aspherical)
$d_5 = 2.4300$ $n_5 = 1.52542$ $v_5 = 55.78$
$r_6 = 71.6141$
$d_6 = 1.6800$
$r_7 = 57.0000$
$r_7 = 27.8000$ $n_7 = 1.52542$ $v_7 = 55.78$
$r_8 = -34.9010$
$d_8 = 0.5000$
$r_9 = 30.2645$ (aspherical)
$d_9 = 2.8000$ $n_9 = 1.49241$ $v_9 = 57.66$
$r_{10} = +23.2550$
$d_{10} = 16.5000$ Conic Constants and Aspherical Coefficients
First Surface
$K = -0.0043$
$A_4 = 2.3183 \times 10^{-3}$, $A_6 = -2.6944 \times 10^{-4}$,
$A_8 = 3.7488 \times 10^{-6}$
Second Surface
$K = -0.0299$
$A_4 = 3.4400 \times 10^{-3}$, $A_6 = -2.2672 \times 10^{-4}$,
$A_8 = 8.7361 \times 10^{-6}$
Fourth Surface
$K = -0.0366$
$A_4 = 7.4091 \times 10^{-5}$, $A_6 = 1.6885 \times 10^{-5}$,
$A_8 = 3.5014 \times 10^{-7}$
Fifth Surface
$K = 0.0459$
$A_4 = -6.1588 \times 10^{-4}$, $A_6 = 5.1648 \times 10^{-6}$,
$A_8 = -1.6888 \times 10^{-7}$
Ninth Surface
$K = -0.0138$
$A_4 = -2.7114 \times 10^{-5}$, $A_6 = 1.0728 \times 10^{-6}$,
$A_8 = -4.4343 \times 10^{-8}$, $A_{10} = 5.2911 \times 10^{-10}$ The following is the numerical data of optical elements constituting the projecting optical system 42 used in the camera of the fourth embodiment.

$r_1 = -13.6732$ (aspherical)
$d_1 = 1.0000$ $n_1 = 1.56781$ $\mu_1 = 30.49$
$r_2 = 61.5408$ (aspherical)
$d_2 = 1.3000$
$r_3 = 11.0300$
$d_3 = 4.5000$ $n_3 = 1.51900$ $\mu_3 = 55.78$
$r_4 = -6.3137$ (aspherical)
$d_4 = 4.0000$
$r_5 = \infty$ (the entrance surface of the path splitting member 45)
$d_5 = 0.7000$ $n_5 = 1.48536$ $\mu_5 = 57.66$
$r_6 = \infty$ (the exit surface of the path splitting member 45)
$d_6 = 3.1000$
$r_7$ (IRED)

Conic Constants and Aspherical Coefficients
First Surface
$K = -0.0043$ $A_4=2.3183\times10^{-3}$, $A_6=-2.6944\times10^{-4}$,
$A_8=3.7488\times10^{-6}$
Second Surface
$K=-0.0299$
$A_4=3.4400\times10^{-3}$, $A_6=-2.2672\times10^{-4}$,
$A_8=3.7361\times10^{-6}$
Fourth Surface
$K=-0.0366$
$A_4=7.4091\times10^{-5}$, $A_6=1.6885\times10^{-5}$,
$A_8=3.5014\times10^{-7}$ In the camera of the fourth embodiment, the values relative to Eq. (1) are as follows:

Distance D from the negative lens to the light-emitting element 50=14.89

Focal length $f_{AF}$ of the projecting optical system 42 =11
$D/f_{AF}=1.35$

In the above numerical data, $r_1, r_2, \ldots$ represent radii of curvature of individual lens surfaces; $d_1, d_2, \ldots$ thicknesses of individual lenses or prisms, or spaces therebetween; $n_1, n_2, \ldots$ refractive indices of individual lenses or prisms; and $\mu_1, \mu_2, \ldots$ Abbe's numbers of individual lenses or prisms.

Also, the configuration of each aspherical surface is expressed by the following equation:

$$X = \frac{Y^2/r^2}{1+\sqrt{1-(K+1)Y^2/r^2}} + A_4Y^4 + A_6Y^6 + A_8Y^8 + A_{10}Y^{10}$$

where X is the coordinate in the direction of the optical axis, Y is the coordinate in the direction normal to the optical axis, K is a conic constant, and $A_4, A_6, A_8,$ and $A_{10}$ are aspherical coefficients of fourth, sixth, eighth, and tenth orders, respectively.

Figure 6A:
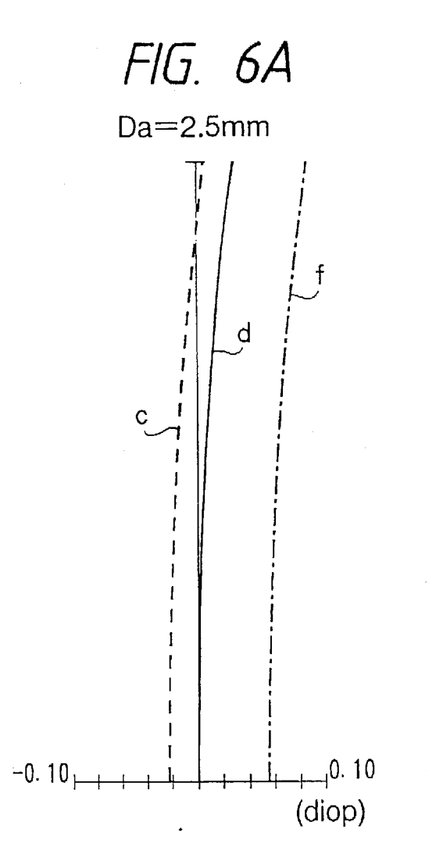
Figure 6B:
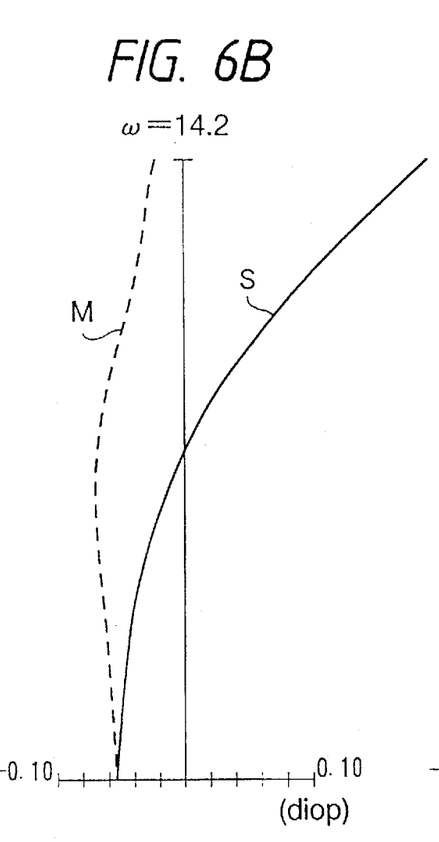
Figure 6C:
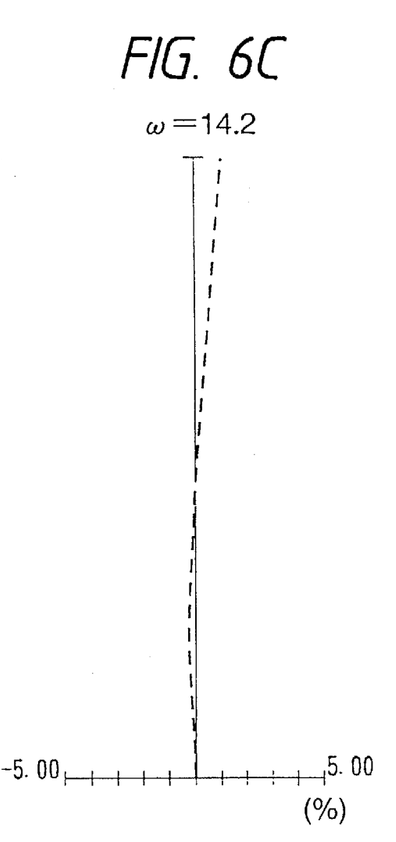
Figure 7:
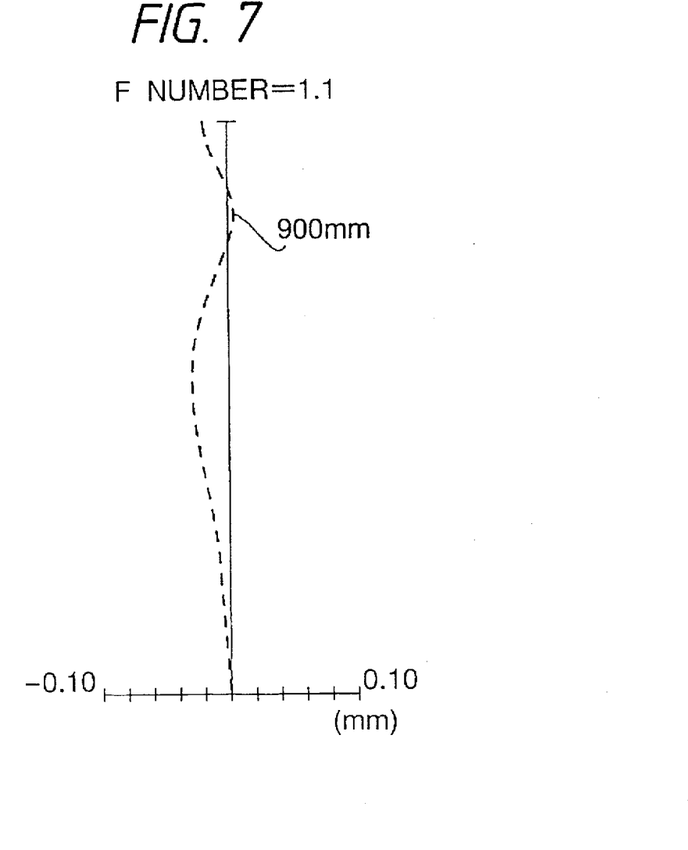

FIGS. 6A, 6B, and 6C show aberration characteristic curves in the finder optical system 41. In these figures, reference symbol Da denotes a pupil diameter and ω denotes a half angle of view. FIG. 7 shows the aberration characteristic curve of the projecting optical system 42.

Fifth Embodiment

Figure 8:
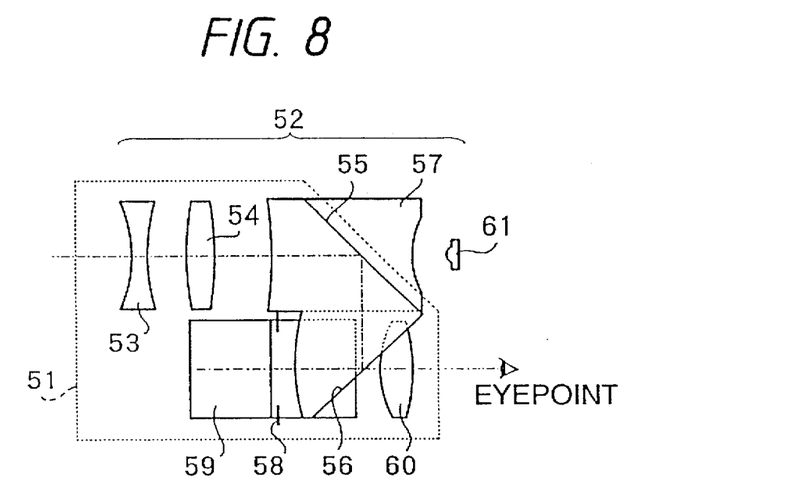

The camera of this embodiment is also designed so that the optical path of the objective system of the finder optical system is partially common with that of the projecting optical system of the range measuring optical system. The fifth embodiment refers to the camera equipped with the finder optical system having a zoom function. In FIG. 8, a finder optical system 51 has a zoom function and comprises, in order from the object side, an objective system including a negative lens 53, a positive lens 54, and a path splitting prism 57 having a first reflecting surface 55 and a second reflecting surface 56 for inverting an image; a field frame 58; and an eyepiece system including a two-reflective prism 59 for inverting the image and a positive lens 60. A magnification change of the finder optical system 51 and a diopter correction involved in this change are made by moving, along the optical axis, the negative lens 53 (a first lens) and the positive lens 54 (a second lens) which constitute the objective system. The intermediate image formed by the objective system is reflected four times by the path splitting prism 57 and the two-reflection prism 59 and becomes an erect image. A projecting optical system 52 is constructed with the negative lens 53, the positive lens 54, the path splitting prism 57, and a light-emitting element 61 for range measurement which are arranged in that order from the object side.

In the camera of the fifth embodiment, the finder optical system 51 and the projecting optical system 52 have a common optical path which ranges from the negative lens 53 to the first reflecting surface (path splitting surface) 55 of the path splitting prism 57. The path splitting prism, 57, like the prism used in the camera of the first embodiment, is constructed in such a way that two prism components are cemented at the first reflecting surface 55, which includes a wavelength-selective mirror capable of reflecting visible light and transmitting infrared light.

The camera of the fifth embodiment, as mentioned above, uses the finder optical system provided with a zoom function, which includes the objective system having the negative and positive lenses. However, a practical arrangement of the objective system is not limited to that of the fifth embodiment, and various modifications are considered. In the present invention, when the optical path is split on the object side of the position (the field frame 58) where the intermediate imaging plane of the objective system of the finder optical system 51 is located, the purpose of the invention can be completely achieved. Hence, in the camera of the fifth embodiment, the path splitting surface may be placed not at the first reflecting surface 55 but at the second reflecting surface 56, which may be constructed with a half mirror.

The path splitting prism 57 is designed so that the optical path from the first reflecting surface 55 to the intermediate imaging plane is provided with a positive refracting power and the optical path from the first reflecting surface 55 to the light-emitting element 61 has a negative refracting power. The negative refracting power of the surface of the path splitting prism 57 which is interposed between the first reflecting surface 55 and the light-emitting element 61 brings about the same effect as in the camera of the second or third embodiment and offers the advantage of providing sufficient space for the light-emitting element 61. In particular, the camera of the fifth embodiment is such that the refracting powers of the objective system of the finder optical system 51 and the projecting optical system 52 can be set independently, and thus the finder optical system and range measuring optical system of high performance are obtained.

Figure 9:
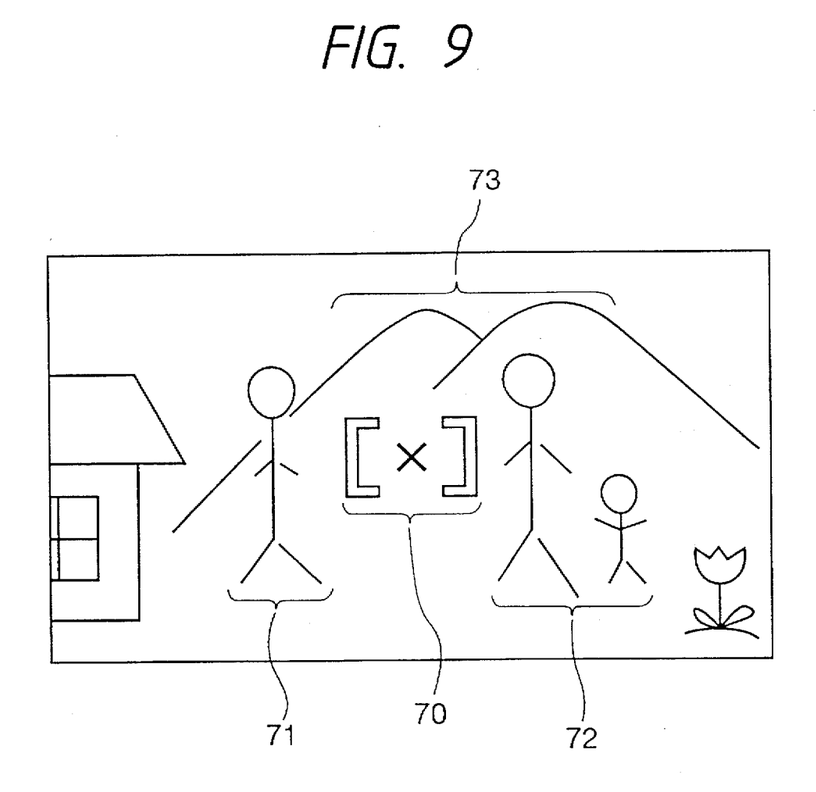

Furthermore, the advantage of the finder optical system 51 provided with a zoom function lies in the fact that a multipoint range measurement is possible. In order to realize the multipoint range measurement, it is required that a light-emitting unit used in the projecting optical system 52, for example, has light-emitting portions at three places, namely a central place of the optical axis and two places around it. The use of such a light-emitting unit makes it possible to take a picture which does not bring about the phenomenon that an object is out of focus because it deviates from the target of focus. This phenomenon is explained with reference to FIG. 9. When the photographer looks through the finder, the photographer sees a target mark 70 so that the focusing position can be easily determined. However, if, as shown in FIG. 9, the photographer takes a picture in a state where objects 71 and 72 that he wants to photograph deviate from the target mark 70, a background 73 will be brought to a focus and the objects 71 and 72 will be out of focus. The fifth embodiment is devised to avoid such problems. In the fifth embodiment, the objective system of the finder optical system 51 has a variable magnification system in common with the projecting optical system 52 so that their magnifications can be changed at the same time. As the field angle of the finder optical system 51 changes, that of the projecting optical system 52 also changes. That is, the position of a projecting spot remains unchanged when the magnification is changed in the visual field of the finder optical system 51, and thus if the photographer merely sees through the finder optical system 51 to determine a photographic composition, an accurate range measurement can be made according to the focus frame not only at the center of the visual field but also in its periphery.

What is claimed is:

1. A camera in which a finder optical system and a range measuring optical system are formed such that they are independent of a photographing optical system, comprising:

a finder objective system having a positive refracting power as a whole;

an image inverting optical system for erecting an image formed by said finder objective system, said image inverting optical system including a path splitting member for splitting a path of emergent light from said finder objective system into a first split path and a second split path;

an eyepiece system having a positive refracting power as a whole for allowing an observer to view the image formed by said finder objective system and erected by said image inverting optical system; and a light emitting element for range measurement, said finder objective system, said image inverting optical system and said eyepiece system forming the finder optical system with said eyepiece system being disposed in the first split path, a portion of said finder optical system in the first split path between said path splitting member of said image inverting optical system and an image plane of said finder objective system forming an optical unit which has at least one optical surface and has a positive refracting power as a whole, said finder objective system, said path splitting member of said image inverting optical system and said light emitting element forming the range measuring optical system with said light emitting element being disposed in the second split path, a portion of said range measuring optical system in the second split path between said path splitting member and said light emitting element being constructed to be powerless as a whole having one of a configuration that:

said path splitting member and said light emitting element are free from intervention of any optical surface therebetween, and the portion of said range measuring optical system between said path splitting member and said light emitting element forms an optical unit having at least one optical surface and having a refracting power of zero as a whole.

2. A camera according to claim 1, wherein a medium bordered with said path splitting member and disposed in the first split path forms a first prism, and said optical unit having the positive refracting power as a whole and located in the first split path between said path splitting member and the image plane of said finder objective system includes a convex surface formed on an image-plane-side end face of said first prism.

3. A camera according to claim 1, wherein a medium bordered with said path splitting member and disposed in the second split path forms a second prism, and said optical unit having the refracting power of zero as a whole and located in the second split path between said path splitting member and said light emitting element includes a plane surface formed on a light-emitting-element-side end face of said second prism.

4. A camera according to claim 1, wherein said optical unit having the positive refracting power as a whole and located in the first split path between said path splitting member and the image plane of said finder objective system includes a positive lens.

5. A camera in which a finder optical system and a range measuring optical system are formed such that they are independent of a photographing optical system, comprising:

a finder objective system having a positive refracting power as a whole;

an image inverting optical system for erecting an image formed by said finder objective system, said image inverting optical system including a path splitting member for splitting a path of emergent light from said finder objective system into a first split path and a second split path;

an eyepiece system having a positive refracting power as a whole for allowing an observer to view the image formed by said finder objective system and erected by said image inverting optical system; and a light emitting element for range measurement, said finder objective system, said image inverting optical system and said eyepiece system forming the finder optical system with said eyepiece system being disposed in the first split path, a portion of said finder optical system in the first split path between said path splitting member of said image inverting optical system and an image plane of said finder objective system being constructed to be powerless as a whole and having one of a configuration that:

said path splitting member of said image inverting optical system and the image plane of said finder objective system are free from intervention of any optical surface therebetween, and the portion of said finder optical system between said path splitting member and the image plane of said finder objective system forms an optical unit having at least one optical surface and having a refracting power of zero as a whole, said finder objective system, said path splitting member of said image inverting optical system and said light emitting element forming the range measuring optical system with said light emitting element being disposed in the second split path, a portion of said range measuring optical system in the second split path between said path splitting member and said light emitting element forming an optical unit which has at least one optical surface and has a negative refracting power as a whole.

6. A camera according to claim 5, wherein a medium bordered with said path splitting member and disposed in the first split path forms a first prism, and said optical unit having the refracting power of zero as a whole and located in the first split path between said path splitting member and the image plane of said finder objective system includes a plane surface formed on an image-surface-side end face of said first prism.

7. A camera according to claim 5, wherein said optical unit having the negative refracting power as a whole and located in the second split path between said path splitting member and said light emitting element includes a negative lens.

8. A camera in which a finder optical system and a range measuring optical system are formed such that they are independent of a photographing optical system, comprising:

a finder objective system having a positive refracting power as a whole, an image inverting optical system for erecting an image formed by said finder objective system, said image inverting optical system including a path splitting member for splitting a path of emergent light from said finder objective system into a first split path and a second split path;

an eyepiece system having a positive refracting power as a whole for allowing an observer to view the image formed by said finder objective system and erected by said image inverting optical system; and a light emitting element for range measurement, said finder objective system, said image inverting optical system and said eyepiece system forming the finder optical system with said eyepiece system being disposed in the first split path, a portion of said finder optical system in the first split path between said path splitting member of said image inverting optical system and an image plane of said finder objective system forming an optical unit which has at least one optical surface and has a positive refracting power as a whole, said finder objective system, said path splitting member of said image inverting optical system and said light emitting element forming the rang measuring optical system with said light emitting element being disposed in the second split path, a portion of said range measuring optical system in the second split path between said path splitting member and said light emitting element forming an optical unit which has at least one optical surface and has a negative refracting power as a whole.

9. A camera according to claims 5 or 8, wherein at least one of said optical surfaces placed between said path splitting member and said light emitting element for range measurement is configured as a concave surface.

10. A camera according to any one of claims 1, 5 or 8 wherein said image inverting optical system includes said path splitting member and three reflecting surfaces.

11. A camera according to claim 10, wherein said image inverting optical system is configured as a prism unit.

12. A camera according to claim 10, wherein said image inverting optical system is configured such that said path splitting member is arranged on an object side of the image plane of said finder objective system and that said three reflecting surfaces are arranged on an eyepiece side of the image plane of said finder objective system.

13. A camera according to claim 12, wherein said path splitting member splits the path of light by separating the emergent light from the finder objective system into reflecting rays and transmitted rays.

14. A camera according to claim 13, wherein the reflecting rays are introduced to the first split path to be used for said finder optical system and the transmitted rays are introduced to the second split path to be used for said range measuring optical system.

15. A camera according to claims 5 or 8 wherein a medium bordered with said path splitting member and disposed in the second split path forms a second prism, and said optical unit having the negative refracting power as a whole and located in the second split path between said path splitting member and said light emitting element includes a concave surface formed on a light-emitting-element-side end face of said second prism.

16. A camera according to claim 8, wherein a medium bordered with said path splitting member and disposed in the first split path forms a first prism, and said optical unit having the positive refracting power as a whole and located in the first split path between said path splitting member and the image plane of said finder objective system includes a convex surface formed on an image-plane-side end face of said first prism.

17. A camera according to claim 16, wherein said image inverting optical system includes said path splitting member and three reflecting surfaces and is configured such that said path splitting member and one of the reflecting surfaces are arranged on an object side of the image plane of said finder optical system and that another two of the reflecting surfaces are arranged on an eyepiece side of the image plane of said finder objective system.

18. A camera according to claim 16, wherein said first prism is provided with said path splitting member and one reflecting surface.

* * * * *